United States Patent [19]
Hillhouse

[11] Patent Number: 6,052,468
[45] Date of Patent: Apr. 18, 2000

[54] METHOD OF SECURING A CRYPTOGRAPHIC KEY

[75] Inventor: Robert D. Hillhouse, Ottawa, Canada

[73] Assignee: DEW Engineering and Development Limited, Ottawa, Canada

[21] Appl. No.: 09/007,183

[22] Filed: Jan. 15, 1998

[51] Int. Cl.[7] .................................................... H04L 9/00
[52] U.S. Cl. ............................................ 380/281; 713/194
[58] Field of Search .................................. 380/23, 44, 59, 380/277, 278, 279, 281, 283, 284; 713/168, 171, 182, 186

[56] References Cited

U.S. PATENT DOCUMENTS

| | | | |
|---|---|---|---|
| 4,386,233 | 5/1983 | Smid et al. | 178/22.08 |
| 5,495,533 | 2/1996 | Linehan et al. | 380/21 |
| 5,719,938 | 2/1998 | Hans et al. | 380/21 |
| 5,768,387 | 6/1998 | Akiyama et al. | 380/4 |
| 5,774,525 | 6/1998 | Kanevsky et al. | 379/88 |
| 5,774,551 | 6/1998 | Wu et al. | 380/25 |
| 5,841,970 | 11/1998 | Tabuki | 395/187.01 |

*Primary Examiner*—Tod R. Swann
*Assistant Examiner*—Trevor Quick Coddington
*Attorney, Agent, or Firm*—Neil Teitelbaum & Associates

[57] ABSTRACT

A method is disclosed for improving portability of secure encryption key data files. The method provides for re-securing key data files according to different security processes for mobility. For porting an encryption key secured using a fingerprint authentication process to a system having only a password authentication process, a user selects password authentication process, provides a fingerprint and is authorised, provides a new password and then the encryption key is accessed according to the fingerprint authentication process and secured according to the password authentication process. This allows the use of specialised security hardware at one location while retaining an ability to transport encryption keys in a secure fashion to other locations, which do not have similar security hardware.

17 Claims, 7 Drawing Sheets

METHOD OF SECURING A CRYPTOGRAPHIC KEY

FIELD OF THE INVENTION

This invention relates generally to identification of individuals and more particularly relates to a method of selectively securing a key database for provision to other users or for transporting the key database.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e. the combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords that are relatively insecure. As such, many systems protected by passwords are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface though which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, find devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterisation is well known and can involve many aspects of fingerprint analysis. The analysis of fingerprints is discussed in the following references, which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73–18, Purdue University, School of Electrical Engineering, 1973;

Wegstein, *An Automated Fingerprint Identification System*, NBS special publication, U.S. Department of Commerce/National Bureau of Standards, ISSN 0083-1883; no. 500-89, 1982;

Moenssens, Andre A., *Fingerprint Techniques*, Chilton Book Co., 1971; and,

Wegstein and J. F. Rafferty, *The LX39 Latent Fingerprint Matcher*, NBS special publication, U.S. Department of Commerce/National Bureau of Standards; no. 500-36, 1978.

Though biometric authentication is a secure means of identifying a user, it is difficult to derive encryption keys from the information. In the first place, the information is different each time it is presented to a biometric information input device. Secondly, the biometric information is retrievable through, for example, extraction of latent fingerprints. When an encryption key is derived directly from biometric information, the extraction of latent biometric information or the interception of biometric information may allow others to derive the encryption key. Thirdly, since some biometric information is substantially unchanging, it is not well suited to encryption because once an encryption key is broken, it's use should be discontinued; however, changing the biometric information on demand is a difficult procedure. In order to overcome this problem, key management systems exist wherein a plurality of keys are stored in a secure key database. A user authentication, such as a biometric authentication, is used to access the secure key database. Often the database is encrypted with a key that is accessible through user authentication.

Key management systems are well known. One such system, by Entrust® Technologies Limited is currently commercially available. Unfortunately, current key management systems are designed for installation on a single computer and for portability between computers having a same configuration. As such, implementation of enhanced security through installation of biometric input devices is costly and greatly limits portability of key databases. Alternatively, password based protection of key databases is undesirable because of the inherent insecure nature of most user selected passwords.

For example, when using Entrust® software to protect a key database, the database is portable on a smart card or on a floppy disk. The portable key database is a duplicate of the existing key database. User authentication for the portable key database is identical to that of the original key database. The implications of this are insignificant when password user authentication is employed; however, when biometric user authentication such as retinal scanning or fingerprint identification are used, the appropriate biometric identification system is required at each lo)cation wherein the portable key database is used. Unfortunately, this is often not the case. In order to avoid this problem, organisations employ password access throughout and thereby reduce overall security to facilitate portability.

Alternatively, members of an organisation are not permitted to travel with portable key databases and thereby have reduced mobility and are capable of performing fewer tasks while outside the office. This effectively counters many of the benefits available in the information age.

It is presently known that a key database, once created, should never be decrypted, except during emergencies. This thinking prevents keys from becoming vulnerable by existing in their decrypted state. The common practice of never decrypting key databases enhances security of the keys themselves, but does little to enhance overall system security. It would, however, be advantageous to enhance system security by providing secure key databases that do not impede portability of the key database.

OBJECT OF THE INVENTION

In an attempt to overcome these and other limitations of the prior art, it is an object of this invention to provide a method of generating secure key databases that is portable to systems having different configurations.

It is a further object of the invention to provide a method of selecting a user authentication method from a plurality of user authorisation methods for use in securing a key data file.

It is a further object of the invention to provide a method of securing a key database with multiple security methods.

SUMMARY OF THE INVENTION

In accordance with the invention there is provided for a system comprising a cryptographic key encrypted and stored in a key data file and a secured key for decrypting the cryptographic key wherein the secured key is stored in a secured fashion, a method of securing the secured key comprising the steps of:

a) accessing stored data associated with the secured key, the data indicative of an access method from a plurality of access methods for accessing the secured key;

b) executing the indicated access method to access the secured key;

c) selecting a method from the plurality of methods for securing the accessed secured key;

d) securing the accessed secured key according to the selected access method; and, e) storing data associated with the secured key, the data indicative of the selected access method.

In an embodiment, the key is secured by providing user authentication information; deriving from the user authentication information a second cryptographic key; encrypting the accessed secured key using the second cryptographic key; and the secured key is accessed by the steps of:

providing user authentication information;

deriving from the user authentication information a third cryptographic key; and, decrypting the secured key using the third cryptographic key.

In accordance with the invention there is provided a method of accessing a secured cryptographic key comprising the steps of:

a) accessing data associated with the secured cryptographic key to determine an authorisation method necessary to access the secured cryptographic key;

b) providing user authorisation information;

c) executing the determined authorisation method to access the secured cryptographic key based on the user authorisation information provided.

In accordance with the invention there is farther provided a method of securing portable key data including encryption key information comprising the steps of:

a) selecting a first authorisation process from a plurality of authorisation processes for securing the portable key data;

b) authenticating access to the secured portable key data according to a different authorisation process, removing the security from the portable key data, and implementing security of the portable key data according to the first authorisation process.

It is an advantage of the present invention that a key data file is portable between systems having different user authentication hardware and methods therein wherein some are common to a plurality of systems.

BRIEF DESCRIPTION OF THE DRAWINGS

An exemplary embodiment of the invention will now be described in conjunction with the attached drawings, in which.

DETAILED DESCRIPTION

The invention is described with respect to finger print registration. The method of this invention is applicable to other biometric verification processes as is evident to those of skill in the art.

One of the many problems with a fingerprint biometric is that a special contact-imaging device is required to image a fingerprint. Today, many systems and, in particular, many personal computers are not equipped with a contact imaging device. It is well known to outfit a network of systems with biometric imaging devices in order to overcome these limitations. Unfortunately, for those who travel on business and need access to encrypted email, such a solution is not possible. Another known solution is to travel with a portable contact-imaging device. Unfortunately, installation of special software and additional hardware expense is commonly required thereby rendering such an approach impractical. According to the invention, a method is proposed for securing encryption key data in accordance with anticipated hardware and security level required.

Figure 1:
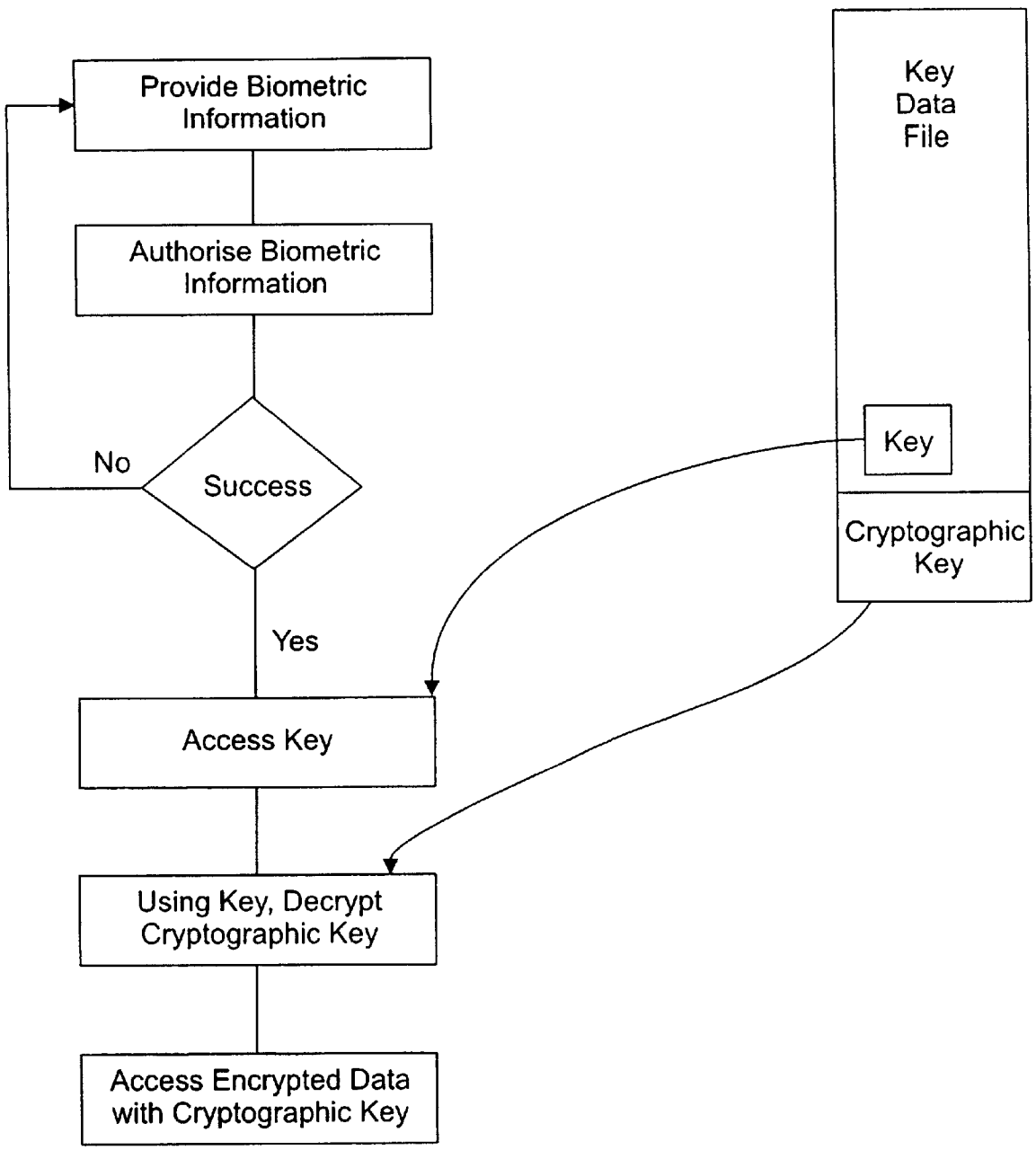
FIG. 1 is a flow diagram of a prior art method of accessing cryptographic keys.

Referring to FIG. 1, a prior art method of accessing secured data is shown for use in a network comprising a plurality of computers each having a biometric imaging means. A key data file comprises a cryptographic key, which is secured using a biometric authentication method. According to the method, biometric authentication is required to access the cryptographic key. For example, the cryptographic key is encrypted using a key secured by the biometric information. Upon presentation of appropriate biometric information, the secured key is accessed, the cryptographic key is decrypted, and the cryptographic key used to encrypt or decrypt data files. Of course, other methods of securing cryptographic keys using biometric authentication are also applicable. For example, key locations may be determined by the user authentication process.

Because a key data file is transportable, an encrypted data file is transportable with the key data file—necessary to access the encrypted data file—to another computer system. Unfortunately, the other computer system must have a same biometric authentication process in order to provide access to the key data file. For example, when the second computer has no biometric information input device, the user authorisation method for accessing the secured key can not be executed and he secured key is not accessible. Without the secured key, the encrypted cryptographic key data can not be accessed when desired. Alternatively, a method of extracting the keys from the key data file absent user authentication is necessary. Such a method is not desirable since it greatly reduces security.

Figure 2:
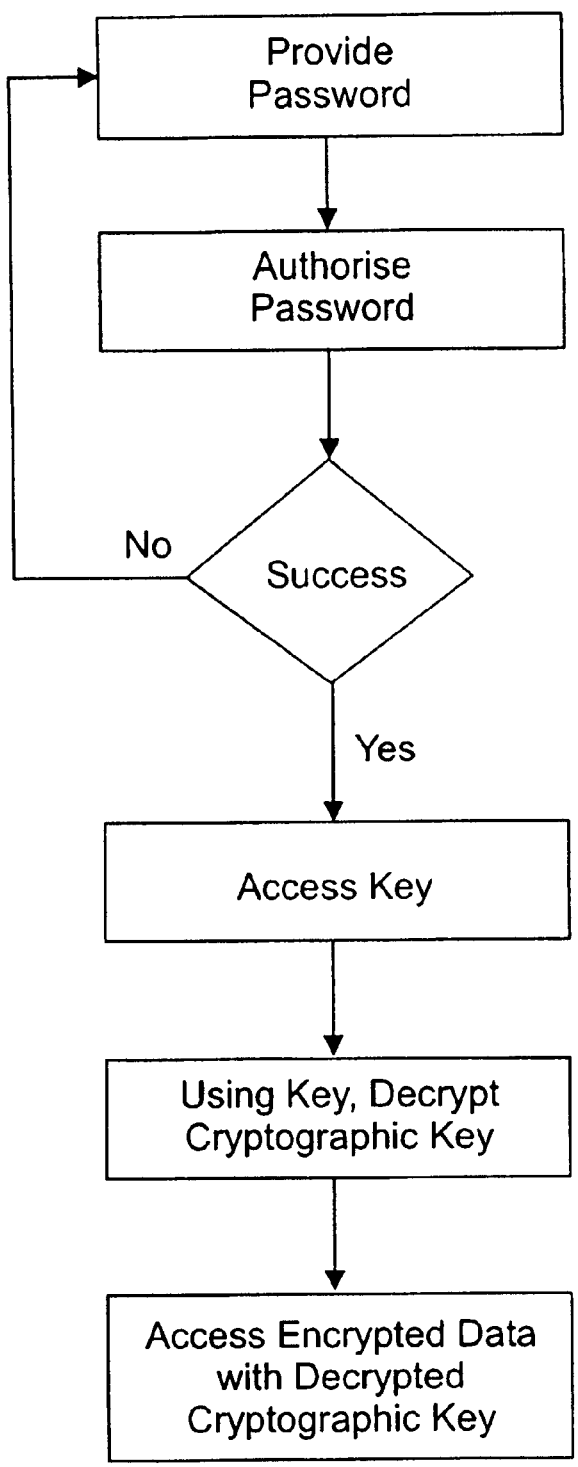
FIG. 2 is a flow diagram of a prior art method of accessing cryptographic keys.

Referring to FIG. 2, a prior art method of accessing secured data for use in a home system having a smart card reader but absent a biometric imaging means is shown. Here, a password or card based user authentication is employed. A smart card having a key data file stored therein is placed into a smart card reader. A user is prompted for user authentication in the form of a password. Once the password is verified, access to the cryptographic key is permitted and encrypted data files are accessible. One such method is to employ the password or a predetermined portion thereof as a key for encrypting the cryptographic key. Another such method is providing access to a secured key upon verification of the password and using the secured key to access the cryptographic key. As is evident to those of skill in the art, conventional key data files can not be transferred from a system employing a method, such as that of FIG. 1, to a system employing a different method, such as that of FIG. 2. Because of this, prior art systems are used in a less than optimally secure fashion wherein a single user authentication system in the form of passwords is used. Alternatively, transportability is reduced where biometric user authentication is conducted. Optionally, the key data file is stored on a floppy disk, a CD-ROM or another data transport mechanism. Preferably, the key data file is not communicated using unsecured electronic communications such as electronic mail over the Internet.

Figure 3:
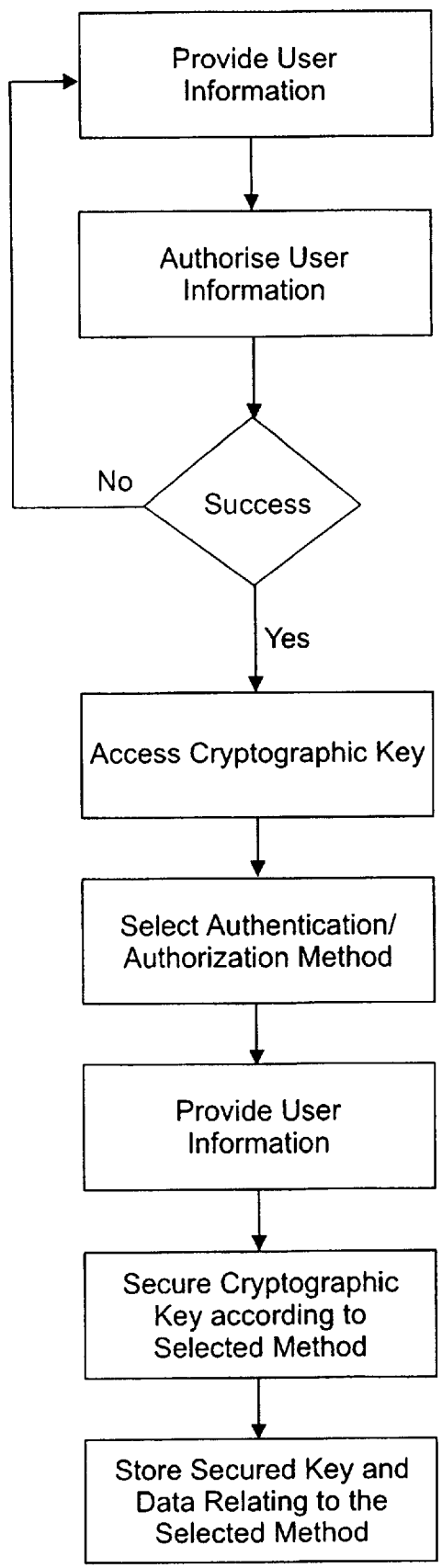
FIG. 3 is a flow diagram of a method of accessing a cryptographic key and securing the cryptographic key according to a selected authentication process according to the invention.

Referring to FIG. 3 and in accordance with the invention, a method is provided allowing porting of encryption key data between systems supporting different user authorisation methods wherein at least a method is common between the systems. Accordingly, a user re-secures a key data file comprising a cryptographic key for porting to another system. User authentication occurs and the cryptographic key is accessed. The user then selects an authentication method in the form of a biometric authentication method such as a fingerprint, a voiceprint, a face, a palm print, a retinal scan, and so forth; a password; a physical key; etc. The authentication method is selected from a plurality of available authentication methods. The user is authenticated according to the selected method and the accessed cryptographic key is secured according to that method. The secured cryptographic key is stored in the key data file with data relating to the selected authorisation method. Optionally, the data relating to the selected authorisation method is stored in a separate location. Further optionally, the secured key data and the data relating to the selected authorisation method is all stored on a smart card for transport, the key data file on the system remaining unchanged. One method of securing the cryptographic key is to encrypt it using a further cryptographic key. The further cryptographic key is often in the form of a secured key, which is accessible through user authorisation. Alternatively, the further cryptographic key is extracted or partially extracted from user authorisation information provided by a user according to the user authorisation method employed. For example, a further cryptographic key may be derived from a password, from relative distances between specific features in a fingerprint, or from data stored in the key data file combined with user provided information.

Since the data relating to the selected authorisation method is stored associated with the key data, accessing the cryptographic key on another system becomes a straightforward task. The key data file or files are provided to the other system. The system accesses the data relating to the selected authorisation method and determines whether or not it has support for the selected authorisation method. When support is not present, a user is informed that the key data file is inaccessible. When support exists, the authorisation method is run to authenticate the user and thereby provide access to the cryptographic key. Of course, the authorisation method may be run at a later time, for example when the user requests access to encrypted data.

Figure 4:
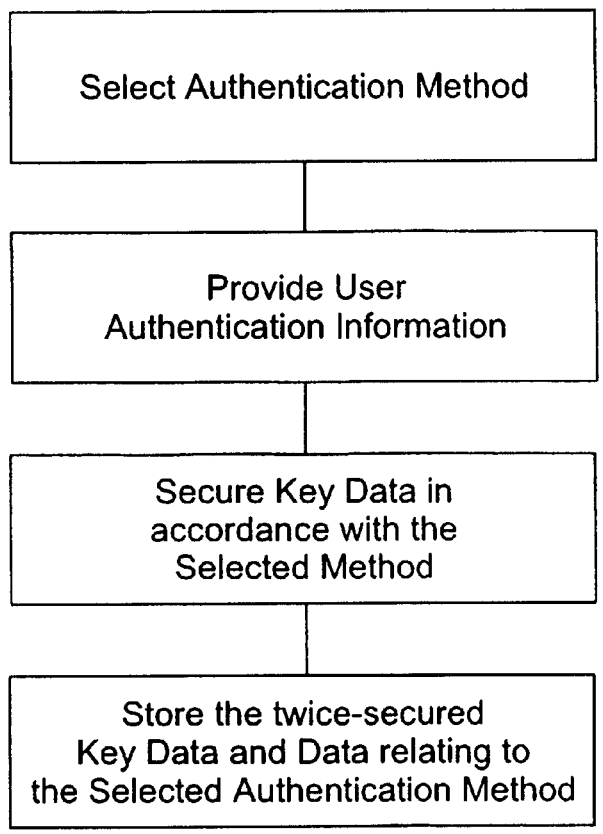
FIG. 4 is a flow diagram of a method of securing a secured cryptographic key according to a selected authentication process according to the invention.

Referring to FIG. 4 and in accordance with the invention, a method is provided for copying or porting encryption key data from a system to another system; the method has enhanced security over prior art methods. In order to accomplish this, a user selects an authentication method in the form of a biometric authentication method such as a fingerprint, a voiceprint, facial features, a palm print, a retinal scan, and so forth; a password; or a key. The authentication method is selected from a plurality of available authentication methods. The user is authenticated according to the selected method and the secured cryptographic key is secured according to that method. The twice-secured cryptographic key is stored in the key data file with data relating to the selected authorisation methods and an order of the securing operations. This allows for multiple user authentication based protection of key data files. For example, such a system is applicable in increasing security by providing for password and biometric security. Also, the method is also useful to prevent access by an individual in a group of individuals absent all members of the group. This is accomplished be securing the cryptographic key data with a user authentication of each individual in the group; only when all individuals are authenticated, will the key data be accessible. Alternatively, the data relating to the selected authorisation method is stored in a separate location. Optionally, the secured key data and the data relating to the selected authorisation method is all stored on a smart card for transport, the key data file on the system remaining unchanged.

Figure 5:
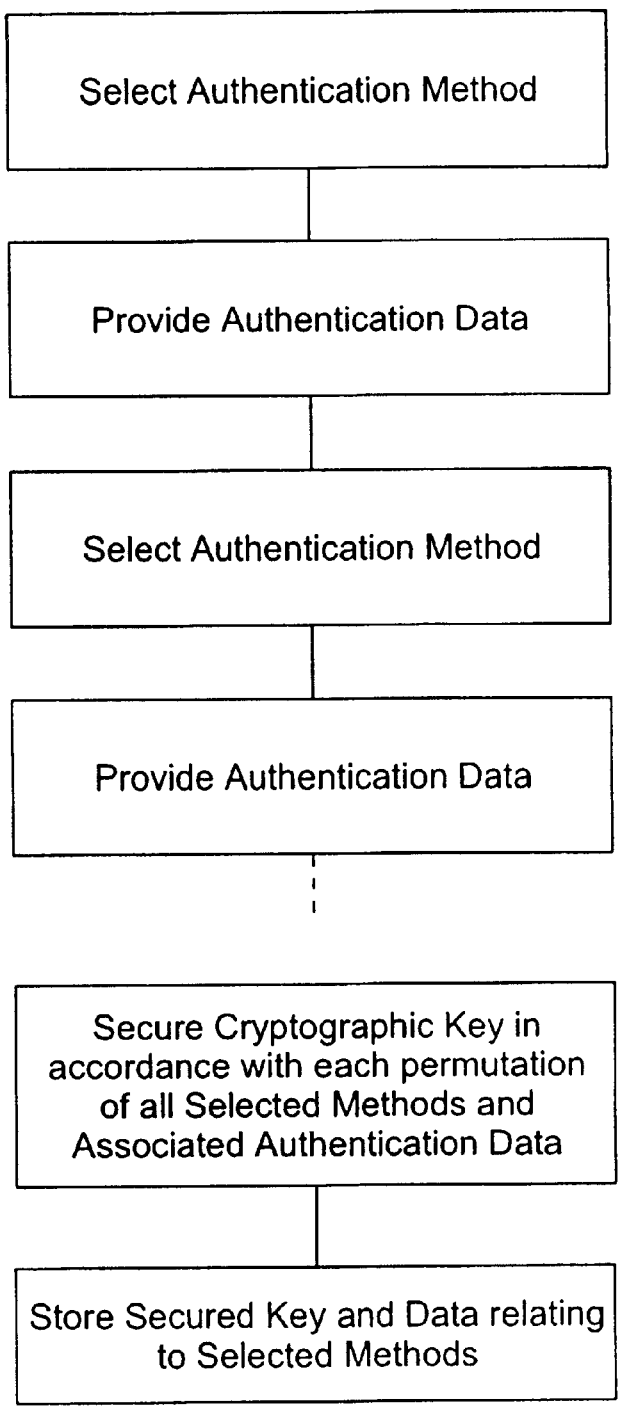
FIG. 5 is a flow diagram of a method of securing a secured cryptographic key according to a plurality of selected authentication processes according to the invention.
Figure 6:
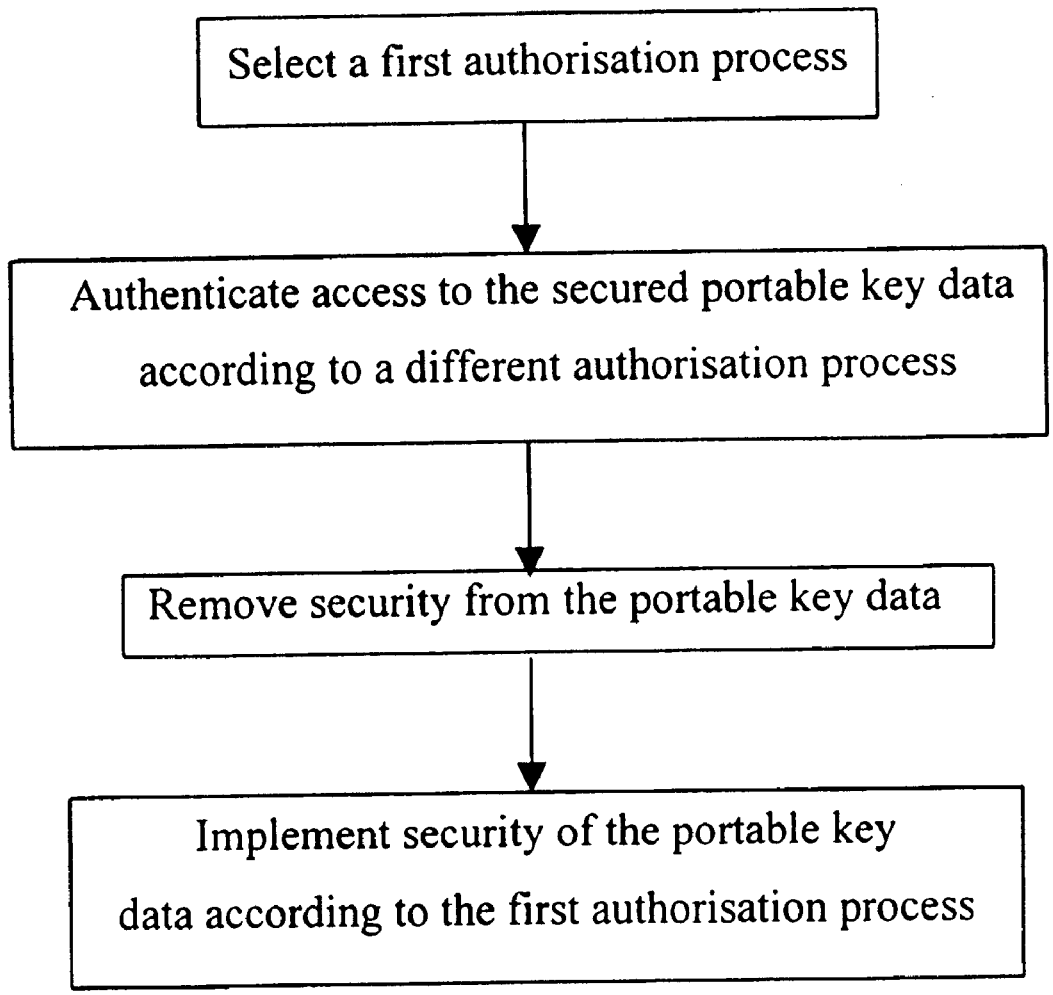
FIG. 6 is a flow diagram of a method of securing portable key data including encryption key information, according to the invention; and, FIG. 7 is a flow diagram of another method of securing portable key data including encryption key information, according to the invention.
Figure 7:
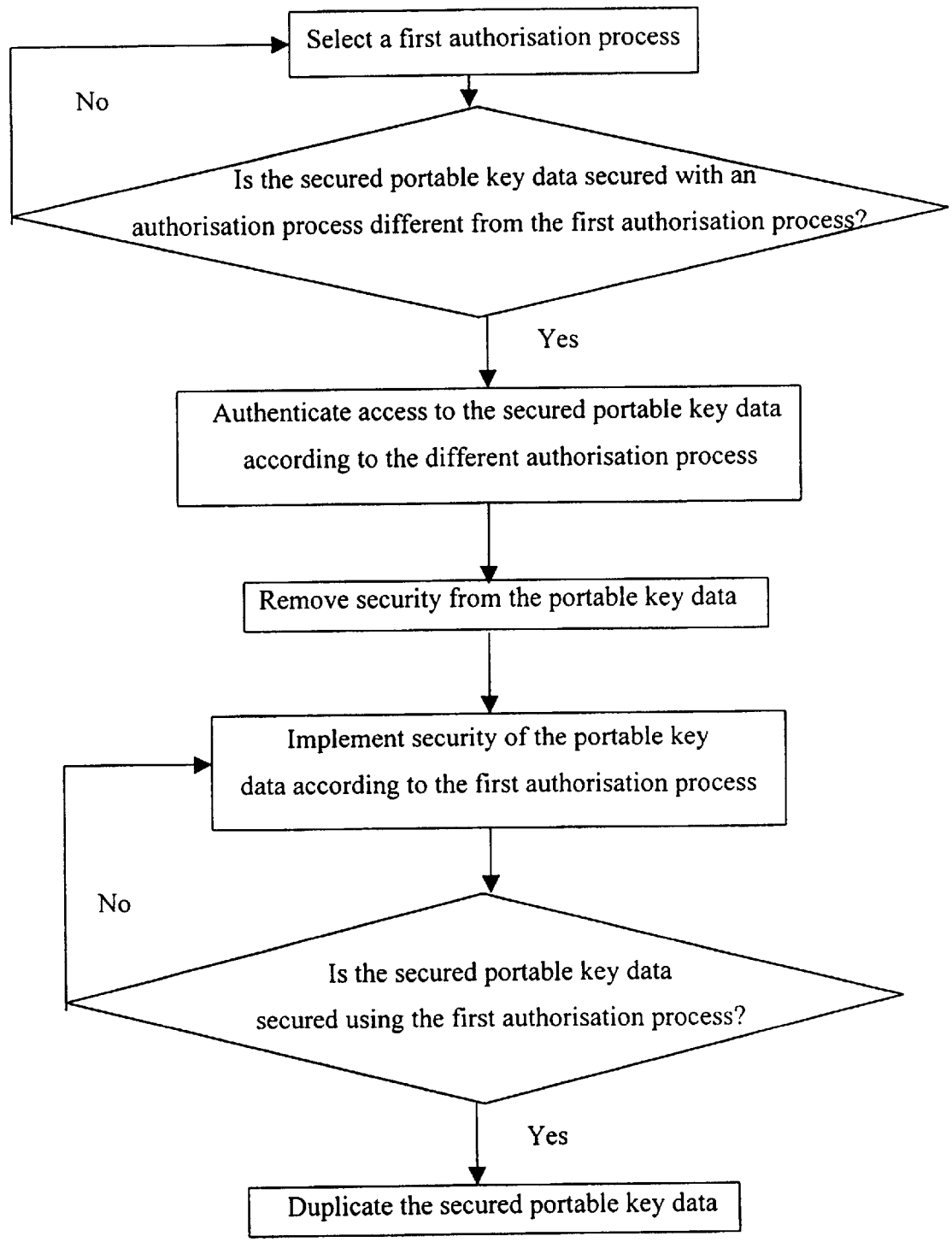

Referring to FIG. 5, a method is provided to secure encryption key data. Accordingly, a user determines to secure a key data file comprising a secured cryptographic key. The user selects an authentication method in the form of a biometric authentication method such as a fingerprint, a voiceprint, a face, a palm print, a retinal scan, and so forth. Alternatively, another authentication method such as a password or a physical key is selected. The authentication method is selected from a plurality of available authentication methods available to the user. The user is authenticated according to the selected method and the secured cryptographic key is secured again according to that method. The secured cryptographic key is stored in the key data file with data relating to the selected authorisation methods and an order of securing operations. The user then selects a further authentication method and the key data is again secured and so forth. Each user authorisation is temporarily stored. The user is also authorised to access the key data as secured prior to application of the method shown in FIG. 5. The key data is then accessed and secured in each permutation of the selected methods. In the example of FIG. 5, this involves securing the key data according to method (1, 2, 3) (1, 3, 2) (2, 1, 3) (2, 3, 1) (3, 1, 2) (3, 2, 1), in six different forms. The resulting data is accessible by providing, in any order, the three appropriate user authentication information samples.

Alternatively, a same result is provided by modifying the cryptographic key access routine to store each user authorisation result temporarily and then to execute same in an appropriate order. Here, a user executes a plurality of user authorisation methods in any order. The system applies each method or results therefrom in an appropriate order to access the cryptographic keys. When no order is stored with the data relating to authorisation methods, the application of each method or results therefrom is performed in every possible permutation. Of course, when such is the case, a checksum or other method of verifying that a cryptographic key is properly accessed is necessary.

In accordance with the invention, a method is provided to provide secure access to encrypted data by each of a plurality of people. Accordingly, a user determines to secure a key data file comprising a secured cryptographic key. The user is authenticated and the cryptographic key is accessed. The user selects an authentication method in the form of a biometric authentication method such as a fingerprint, a voiceprint, a face, a palm print, a retinal scan, and so forth; a password; or a key. The authentication method is selected from a plurality of available authentication methods. Another user is authenticated according to the selected method and the secured cryptographic key is secured according to that method. The secured cryptographic key is stored in a second other key data file with data relating to the selected authorisation method. Alternatively, the key data is stored in a same file along with the previous secure key data. This allows for user authentication of any of a plurality of individuals providing access to same key data.

In some systems, a key data server comprises secure key data for a plurality of cryptographic keys. Using such a system and prior to travel, a user requests packaging of some keys for transport. The keys are packaged on a non-volatile memory device in the form of a smart card, a floppy disk, a PCMCIA card, a dongle, or another similar device. Prior to packaging the keys are secured according to a user selected authorisation method. The key server accesses the key data and then secures it according to the selected method and stores the resultant key data file and data indicative of the selected method in the non-volatile memory device.

According to an embodiment the data indicative of a user authorisation method comprises a sequence of bytes including a length for indicating, one of the data length and the number of authentication methods employed to secure the key data and an indicator of a user authentication method comprising a number, for example 2 bytes, unique to each available method. Typically two bytes are used to identify the method selected thereby allowing for over 65,000 different user authentication methods. This permits the implementation of variations on user authentication methods to increase the difficulty of breaking the security of the key data. Preferably only a single byte is used to indicate data length as it is obvious to those in the art that requiring application of more than 128 methods of user authentication in order to access key data renders such a system inconvenient. Of course, when desired, such a configuration can be implemented without difficulty.

A plurality of methods of securing the cryptographic keys is known. For example, a password authorisation method is used. The password is hashed according to a known algorithm to create a 64-bit code. The code is then used according to known encryption algorithms, to encrypt the cryptographic key. Alternatively, the code is used to encrypt a key, which is used to encrypt the cryptographic key. The use of another key—a secured key—to encrypt the cryptographic key data allows for more robust key selection for this task. Further, selection of such a key minimises a number of tines or fashions in which a cryptographic key is accessible within a system. It is preferable to access and re-secure a secured key once removed from the secured cryptographic keys, than to repeatedly access and re-secure the cryptographic keys, themselves. Alternatively, a biometric information sample in the form of a fingerprint is provided. A central location of the fingerprint is calculated. Distances between the centre and some closest features are determined. The results are used to generate a multi-bit encryption key. Alternatively, the results are used to scramble, hide, unlock, or arithmetically obscure the secured key or, when a secured key is not used, the cryptographic key. Of course, many different fingerprint analysis methods may be employed, each having a unique authorisation method identifier. Therefore, provision of a fingerprint is not indicative of the biometric authorisation method whereas the authorisation method is indicative of necessary user input. Similarly, many methods of extracting a key from a password are known and, according to the present invention, those implemented each have a unique authorisation method identifier.

Numerous other embodiments may be envisaged without departing from the spirit and scope of the invention.

What is claimed is:

1. In a system comprising a cryptographic key encrypted and stored in a key data file and a secured key for decrypting the cryptographic key wherein the secured key is stored in a secured fashion, a method of securing the secured key comprising the steps of:

a) accessing stored data associated with the secured key, the data indicative of an access method from a plurality of access methods for accessing the secured key on a first computer;

b) executing the indicated access method to access the secured key;

c) selecting a method from the plurality of methods for securing the accessed secured keys the method selected to provide for access to the key data file on a second other computer;

d) securing the accessed secured key according to the selected access method; and, e) storing data associated with the secured key, the data indicative of the selected access method.

2. A method of securing the secured key as defined in claim 1 wherein the plurality of access methods are methods of authenticating a user.

3. A method of securing the secured key as defined in claim 2 wherein the steps (a), (b), (d), and (e) are performed by at least a processor in a computer system and wherein each of the plurality of access methods is available for execution by the at least a processor.

4. A method of securing the secured key as defined in claim 2 wherein the methods of authenticating a user include password based user authentication and biometric user authentication.

5. A method of securing the secured key as defined in claim 4 wherein the biometric user authentication is fingerprint authentication.

6. In a system comprising a cryptographic key encrypted and stored in a key data file and a secured key for decrypting the cryptographic key wherein the secured key is stored in a secured fashion, a method of securing the secured key comprising the steps of:

a) accessing stored data associated with the secured key, the data indicative of an access method from a plurality of access methods for accessing the secured key;

b) executing the indicated access method to access the secured key;

c) selecting a method from the plurality of methods for securing the accessed secured key;

d) securing the accessed secured key according to the selected access method;

e) storing data associated with the secured ken the data indicative of the selected access method;

wherein the accessed secured key is secured by the steps of:

providing user authentication information;

deriving from the user authentication information a second cryptographic key; and encrypting the accessed secured key using the second cryptographic key.

7. A method of securing the secured key as defined in claim 6 wherein the secured key is accessed by the steps of:

providing user authentication information;

deriving from the user authentication information a third cryptographic key; and, decrypting the secured key using the third cryptographic key.

8. A method of securing the secured key as defined in claim 1, wherein the encrypted cryptographic key, the secured key and the stored data are stored in a same electronic file.

9. A method of securing the secured key as defined in claim 1 comprising the steps of: selecting a method from the plurality of methods for securing the secured key; securing the secured key according to the selected access method; and, storing data associated with the twice-secured key, the data indicative of the selected access method.

10. A method of securing the secured key as defined in claim 1, wherein the steps (a), (b), (d), and (e) are performed automatically and wherein steps (b) and (d) require information provided by an individual.

11. A method of securing the secured key as defined in claim 1, wherein the step (b) comprises the step of:

prompting for provision of authorisation information according to the access method; and the step (d) comprises the steps of:

prompting for provision of authorisation information according to the selected authorisation method.

12. A method of accessing a secured cryptographic key comprising the steps of:

a) accessing data associated with the secured cryptographic key to determine an authorisation method necessary to access the secured cryptographic key;

b) providing user authorisation information;

c) executing the determined authorisation method to access the secured cryptographic key based on the user authorisation information provided.

13. A method of accessing a secured cryptographic key as defined in claim 12, comprising the step of:

prompting for provision of authorisation information according to the indicated access method.

14. A method of accessing a secured cryptographic key comprising the steps of:

a) accessing data associated with the secured cryptographic key to determine an authorisation method necessary to access the secured cryptographic key;

b) providing user authorisation information;

c) executing the determined authorisation method to access the secured cryptographic key based on the user authorisation information provided;

wherein the step (c) comprises the step of:

decrypting the secured cryptographic key using a cryptographic key determined from the provided authorisation information.

15. A method of accessing a secured cryptographic key as defined in claim 12, wherein the secured cryptographic key is a secured key for securing a further cryptographic key.

16. A method of securing portable key data including encryption key information comprising the steps of:

a) selecting a first authorisation process from a plurality of authorisation processes for securing the portable key data;

b) authenticating access to the secured portable key data according to a different authorisation process, removing the security from the portable key data, and implementing security of the portable key data according to the first authorisation process.

17. A method of securing portable key data including encrypt; on key information as defined in claim 16 comprising the steps of determining if the secured portable key data is secured using the first authorisation process;

when the secured portable key data is secured using the first authorisation process duplicating the secured portable key data;

wherein the step (b) is only executed when the secured portable key data is secured using an authorisation process different from the first authorisation process.

* * * * *

UNITED STATES PATENT AND TRADEMARK OFFICE
CERTIFICATE OF CORRECTION

PATENT NO. : 6,052,468  
DATED : April 18, 2000  
INVENTOR(S) : Hillhouse

Page 1 of 2

It is certified that error appears in the above-identified patent and that said Letters Patent is hereby corrected as shown below:

In column 1, line 64, the expression "find devices" should read --and devices--;

In column 3, line 33, the expression "lo)cation" should read --location--;

In column 4, line 37, the expression "farther" should read --further--;

In column 5, line 55, the expression "he secured" should read --the secured--;

UNITED STATES PATENT AND TRADEMARK OFFICE
CERTIFICATE OF CORRECTION

PATENT NO. : 6,052,468
DATED : April 18, 2000
INVENTOR(S) : Hillhouse

It is certified that error appears in the above-indentified patent and that said Letters Patent is hereby corrected as shown below:

In column 7, line 19, the expression "be securing" should read --by securing--;

In column 8, line 54, the expression "of tines" should read --of times--;

In claim 1, line 24, the expression "secured keys" should read --secured key--;

In claim 6, line 63, the expression "secured ken" should read --secured key,--; and In claim 16, line 10, the expression "encrypt; on" should read --encryption--.

Signed and Sealed this

Twenty-ninth Day of May, 2001

Attest:

NICHOLAS P. GODICI

*Attesting Officer*  *Acting Director of the United States Patent and Trademark Office*